United States Patent [19]

Roesler et al.

[11] Patent Number: 6,057,415
[45] Date of Patent: May 2, 2000

[54] WATER DISPERSIBLE POLYISOCYANATES CONTAINING ALKOXYSILANE GROUPS

[75] Inventors: Richard R. Roesler, Wexford, Pa.; Myron W. Shaffer, New Cumberland, W. Va.; Poli Yu, Wexford, Pa.; Lutz Schmalstieg, Köln, Germany

[73] Assignees: Bayer Corporation, Pittsburgh, Pa.; Bayer Aktiengesellschaft, Leverkusen, Germany

[21] Appl. No.: 09/058,072

[22] Filed: Apr. 9, 1998

[51] Int. Cl.[7] .............................. C08G 77/04; C07F 7/04
[52] U.S. Cl. .............................. 528/28; 528/34; 556/414
[58] Field of Search ................. 528/38, 41; 556/414, 556/417

[56] References Cited

U.S. PATENT DOCUMENTS

| | | | |
|---|---|---|---|
| 4,650,835 | 3/1987 | Eck | 525/440 |
| 5,041,494 | 8/1991 | Franke et al. | 524/588 |
| 5,075,370 | 12/1991 | Kubitza et al. | 524/591 |
| 5,336,711 | 8/1994 | Schneider et al. | 524/507 |
| 5,344,873 | 9/1994 | Blum | 524/591 |
| 5,354,808 | 10/1994 | Onwumere et al. | 524/837 |
| 5,364,955 | 11/1994 | Zwiener | 556/418 |
| 5,372,875 | 12/1994 | Markusch et al. | 428/228 |
| 5,387,642 | 2/1995 | Blum et al. | 524/591 |
| 5,389,718 | 2/1995 | Potter et al. | 524/591 |
| 5,459,197 | 10/1995 | Schwindt et al. | 524/591 |
| 5,554,686 | 9/1996 | Frisch, Jr. et al. | 524/588 |
| 5,574,122 | 11/1996 | Yeske | 528/28 |

*Primary Examiner*—Gary Geist
*Assistant Examiner*—Jean F Vollano
*Attorney, Agent, or Firm*—Joseph C. Gil; Thomas W. Roy

[57] ABSTRACT

The present invention relates to compounds having an isocyanate group content (calculated as NCO, MW 42) of 0.2 to 20% by weight and an alkoxysilane group content (calculated as Si, MW 28) of 0.2 to 4.5% by weight, wherein the preceding percentages are the weight of the compounds, and containing sufficient chemically incorporated hydrophilic groups to form a stable dispersion in water, wherein the alkoxysilane groups are incorporated as the reaction product of i) a polyisocyanate component having a minimum average functionality of 2.4 and containing at least 50% by weight of polyisocyanate adducts and
 ii) compounds containing secondary amino groups and alkoxysilane groups.

The present invention is also directed to the use of these compounds in admixture with isocyanate-reactive resins in aqueous, two-component coating, adhesive and sealant compositions.

17 Claims, No Drawings

WATER DISPERSIBLE POLYISOCYANATES CONTAINING ALKOXYSILANE GROUPS

FIELD OF THE INVENTION

The present invention relates to water dispersible compounds containing isocyanate and alkoxysilane groups incorporated through secondary amino groups.

BACKGROUND OF THE INVENTION

Two-component aqueous compositions containing a water dispersible polyisocyanate component and various water dispersible or water soluble isocyanate-reactive resins, such as polyhydroxy components, are known and described in U.S. Pat. Nos. 5,075,370, 5,389,718, 5,387,642, 5,372,875, 5,336,711, 5,344,873 and 5,459,197. The aqueous compositions may be used for a wide range of commercial applications such as adhesives, sealants or coatings for various substrates including textile fabrics, plastic, wood, glass fibers and metals. Chemical resistance, abrasion resistance, toughness, tensile strength, elasticity and durability are among the many desirable properties of these coatings.

It is known to incorporate alkoxysilane groups into one-component, fully reacted, aqueous polyurethane dispersions. See, e.g., U.S. Pat. Nos. 5,041,494, 5,354,808 and 5,554,686. However, in these patents the alkoxysilane groups are incorporated compounds containing primary amino groups and alkoxysilane groups, such as N-(3-triethoxysilylpropyl) amine. When it is attempted to modify the polyisocyanate component used in two-component aqueous compositions with compounds containing primary amino groups and alkoxysilane groups, the resulting modified polyisocyanates are not dispersible in water.

Accordingly, it is an object of the present invention to provide water dispersible polyisocyanates containing alkoxysilane groups, which are dispersible in water.

This object can be achieved in accordance with the present invention by incorporating the alkoxysilane groups through secondary amino groups.

Copending applications, U.S. Ser. Nos. 08/992,163 and 08/992,551, disclose the preparation of polyurethane-urea dispersions containing alkoxysilane groups incorporated through secondary amino groups, such as aspartate groups. However, the polyurethane dispersions are prepared from monomeric polyisocyanates as opposed to the polyisocyanate adducts required by the subject application.

SUMMARY OF THE INVENTION

The present invention relates to compounds having an isocyanate group content (calculated as NCO, MW 42) of 0.2 to 20% by weight and an alkoxysilane group content (calculated as Si, MW 28) of 0.2 to 4.5% by weight, wherein the preceding percentages are based on the weight of the compounds, and containing sufficient chemically incorporated hydrophilic groups to form a stable dispersion in water, wherein the alkoxysilane groups are incorporated as the reaction products of i) a polyisocyanate component having a minimum average functionality of 2.4 and containing at least 50% by weight of polyisocyanate adducts and ii) amino compounds corresponding to formula I

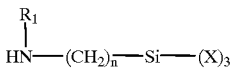

(I)

wherein

X represents identical or different organic groups which are inert to isocyanate groups below 100° C., provided that at least one of these groups is an alkoxy group, $R_1$ represents an organic group which is inert to isocyanate groups at a temperature of 100° C. or less, and n is an integer from 1 to 8.

The present invention is also directed to the use of these compounds in admixture with isocyanate-reactive resins in aqueous, two-component coating, adhesive and sealant compositions.

DETAILED DESCRIPTION OF THE INVENTION

Compounds a) containing isocyanate and alkoxysilane groups are based on the reaction products of polyisocyanates, amino-functional silanes and compounds containing hydrophilic groups, such as non-ionic, anionic and/or cationic groups. The silanes are incorporated through the formation of urea groups, while the hydrophilic groups are preferably incorporated through the formation of urethane groups.

Suitable compounds containing alkoxysilane groups and amino groups include those corresponding to formula I wherein X represents identical or different organic groups which are inert to isocyanate groups below 100° C., provided that at least one of these groups is an alkoxy or acyloxy group, preferably alkyl or alkoxy groups having 1 to 4 carbon atoms and more preferably alkoxy groups, $R_1$ represents an organic group which is inert to isocyanate groups at a temperature of 100° C. or less, preferably an alkyl, cycloalkyl or aromatic group having 1 to 12, preferably 1 to 8 carbon atoms, or a group corresponding to formula II

(II)

and n is an integer from 1 to 8, preferably 2 to 4 and more preferably 3.

Especially preferred are compounds in which X represents methoxy, ethoxy groups or propoxy groups, more preferably methoxy or ethoxy groups and most preferably methoxy groups, and n is 3.

Examples of suitable aminoalkyl alkoxysilanes of formula I containing secondary amino groups include N-phenylaminopropyltrimethoxysilane (available as A-9669 from OSI Specialties, Witco), bis-(γ-trimethoxysilylpropyl) amine (available as A-1170 from OSI Specialties, Witco), N-cyclohexylaminopropyltriethoxy-silane, N-methylaminopropyltrimethoxysilane and the corresponding alkyl diethyoxy and dimethoxy silanes.

A special group of compounds containing alkoxysilane groups are those which also contain aspartate groups, such as those corresponding to formula III $$Z—CHR_3—CR_4—NH—(CH_2)_n—Si—(X)_3 \quad\quad (III)$$
$$\overset{|}{\underset{}{COOR_2}}$$

wherein

X and n are as defined above,

Z represents COOR$_5$ or an aromatic ring, preferably COOR$_5$,

R$_2$ and R$_5$ are identical or different and represent organic groups which are inert to isocyanate groups at a temperature of 100° C. or less, preferably alkyl groups having 1 to 9 carbon atoms, more preferably methyl, ethyl or butyl groups and R$_3$ and R$_4$ are identical or different and represent hydrogen or organic groups which are inert to isocyanate groups at a temperature of 100° C. or less, preferably hydrogen.

The compounds of formula III are prepared by reacting aminoalkyl alkoxysilanes corresponding to formula IV $$H_2N—(CH_2)_n—Si—(X)_3 \quad\quad (IV)$$

with maleic, fumaric or cinnamic acid esters corresponding to formula V $$Z—CR_3=CR_4—COOR_2 \quad\quad (V)$$

Examples of suitable aminoalkyl alkoxysilanes of formula IV include 2-aminoethyl-dimethylmethoxy-silane; 6-aminohexyl-tributoxysilane; 3-aminopropyl-trimethoxysilane; 3-aminopropyl-triethoxysilane; 3-aminopropyl-methyldiethoxysilane; 5-aminopentyl-trimethoxysilane; 5-aminopentyl-triethoxysilane and 3-aminopropyl-triisopropoxysilane. 3-aminopropyl-trimethoxysilane and 3-aminopropyl-triethoxysilane are particularly preferred.

Examples of optionally substituted maleic, fumaric or cinnamic acid esters suitable for use in the preparation of the polyaspartates include dimethyl, diethyl, dibutyl (e.g., di-n-butyl), diamyl, di-2-ethylhexyl esters and mixed esters based on mixture of these and/or other alkyl groups of maleic acid and fumaric acid; the methyl, ethyl and butyl esters of cinnamic acid; and the corresponding maleic, fumaric and cinnamic acid esters substituted by methyl in the 2- and/or 3-position. The dimethyl esters of maleic acid are preferred and the diethyl and dibutyl esters are especially preferred.

The reaction of primary amines with maleic, fumaric or cinnamic acid esters to form the aspartates of formula III is known and described, e.g. in U.S. Pat. No. 5,364,955, which is herein incorporated by reference. The preparation of the aspartates may be carried out, for example, at a temperature of 0 to 100° C. using the starting materials in such proportions that at least 1, preferably 1, olefinic double bond is present for each primary amino group. Excess starting materials may be removed by distillation after the reaction. The reaction may be carried out with or without a solvent, but the use of a solvent is less preferred. If a solvent is used, dioxane is an example of a suitable solvent.

The compounds containing alkoxysilane groups and amino groups are reacted in an amount sufficient to incorporate 0.2 to 4.5% by weight, preferably 0.2 to 4% by weight and more preferably 0.5 to 3.5% by weight of alkoxysilane groups (calculated as Si, MW 28), based on the weight of the compounds containing isocyanate and alkoxysilane groups. The compounds of formula III are colorless to pale yellow.

They may be reacted with polyisocyanate component i) to form the compounds containing isocyanate and alkoxysilane groups without further purification.

In accordance with the present invention the special type of urea groups formed by the reaction of the compounds containing alkoxysilane groups and aspartate groups with the polyisocyanate component may be converted to hydantoin groups in known manner by heating the compounds at elevated temperatures, optionally in the presence of a catalyst. Therefore, the term "urea groups" is also intended to include other compounds containing the group, N—CO—N, such as hydantoin groups.

The polyisocyanate component for preparing the compounds containing isocyanate and alkoxysilane groups has a minimum average functionality of 2.4, preferably to 2.6 and more preferably 2.8, and a maximum average functionality of 6 more preferably 5. The polyisocyanate component may contain monomeric diisocyanates or polyisocyanate adducts having functionalities which do not satisfy these requirements, provided that the average functionality of the polyisocyanate component satisfies these requirements.

The polyisocyanate component contains at least 50% by weight, preferably at least 70% by weight, more preferably at least 95% by weight of polyisocyanates adducts containing isocyanurate, uretdione, biuret, urethane, allophanate, carbodiimide and/or oxadiazine-trione, preferably isocyanurate, uretdione, biuret and/or allophanate groups. In addition to the polyisocyanate adducts the polyisocyanate component may optionally contain either monomeric polyisocyanates or other polyisocyanate adducts.

Suitable monomeric diisocyanates, which may be present in the polyisocyanate component in the form of monomers or which may be used to prepare the polyisocyanate adducts, are represented by the formula $$R(NCO)_2$$

in which R represents an organic group obtained by removing the isocyanate groups from an organic diisocyanate having a molecular weight of about 112 to 1,000, preferably about 140 to 400. Diisocyanates preferred for the process according to the invention are those in which R represents a divalent aliphatic hydrocarbon group having 4 to 40, preferably 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenyl-methane diisocyanate, 1,5-diisocyanato naphthalene and mixtures thereof.

Monomeric polyisocyanates containing 3 or more isocyanate groups such as 4-isocyanantomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be present in the polyisocyanate component or used to prepare the polyisocyanate adducts.

Preferred organic diisocyanates include 1,6-hexamethylene diisocyanate, 1-isocyanato-3-isocyanatomethyl-3,5,5-trimethylcyclohexane (isophorone diisocyanate or IPDI), bis-(4-isocyanatocyclohexyl)-methane, 1-isocyanato-1-methyl-4(3)-isocyanatomethyl cyclohexane, 2,4- and/or 2,6-toluylene diisocyanate, and 2,4- and/or 4,4'-diphenyl-methane diisocyanate.

In accordance with the present invention at least a portion of the polyisocyanate component is in the form of a polyisocyanate adduct having an average functionality of 2 to 6 and an NCO content of 5 to 30% by weight. Examples include:

1) Isocyanurate group-containing polyisocyanates which may be prepared as set forth in DE-PS 2,616,416, EP-OS 3,765, EP-OS 10,589, EP-OS 47,452, U.S. Pat. Nos. 4,288,586 and 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g, a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or U.S. Pat. No. 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to monoallophanate groups of about 10:1 to 1:10, preferably about 5:1 to 1:7.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

8) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, biuret groups, allophanate groups and/or uretdione groups.

Suitable hydrophilic compounds which can be used to enable the compounds containing isocyanate and alkoxysilane groups to be stably dispersed in an aqueous medium are compounds containing lateral or terminal, hydrophilic ethylene oxide units and/or compounds containing ionic or potential ionic groups. The ionic or potential ionic groups may be either anionic or cationic groups, preferably anionic groups. Examples of anionic groups include carboxylate and sulfonate groups, while examples of cationic groups include ammonium and sulfonium groups.

Compounds which are stably dispersed are those that remain mixed with water, either in the form of an oil-in-water emulsion or a water-in-oil emulsion, without settling, coagulation or separation for a period of time sufficient to use the dispersion for its intended purpose. In accordance with the present invention the compounds containing isocyanate and alkoxysilane groups also contain a minimum of 2.5% of hydrophilic ethylene oxide units, based on the weight of the compounds containing isocyanate and alkoxysilane groups, or a minimum of 5 milliequivalents of ionic groups, per 100 parts of the compounds containing isocyanate and alkoxysilane groups.

When only hydrophilic ethylene oxide units are used to provide hydrophilicity, they are generally incorporated in an amount of 5 to 35%, preferably 10 to 30% and more preferably about 12 to 25% by weight, based on the weight of the compounds containing isocyanate and alkoxysilane groups.

Suitable compounds for incorporating the lateral or terminal, hydrophilic ethylene oxide units are known and disclosed in U.S. Pat. Nos. 3,905,929, 3,920,598 and 4,190,566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example, propylene oxide.

When only ionic groups are used to provide hydrophilicity, they are incorporated in an amount sufficient to provide an ionic group content of 10 to 200 milliequivalents, preferably 10 to 100 milliequivalents and more preferably 25 to 50 milliequivalents, per 100 g of the compounds containing isocyanate and alkoxysilane groups.

The ionic groups are formed by neutralizing the corresponding potential ionic groups either prior to, during or after formation of the compounds containing isocyanate and alkoxysilane groups. When the potential ionic groups are neutralized prior to their incorporation into the these compounds, the ionic groups are incorporated directly. When neutralization is performed subsequent to forming these compounds, potential ionic groups are incorporated.

Suitable compounds for incorporating the carboxylate, sulfonate and quaternary nitrogen groups are described in U.S. Pat. Nos. 3,479,310, 4,108,814 and 4,303,774, the disclosures of which are herein incorporated by reference. Suitable compounds for incorporating tertiary sulfonium groups are described in U.S. Pat. No. 3,419,533, also incorporated by reference. The preferred sulfonate groups for incorporation into the NCO prepolymer are the diol sulfonic acids or the diol sulfonates disclosed in U.S. Pat. No. 4,108,814.

The neutralizing agents for converting the potential ionic groups to ionic groups are described in the preceding U.S. patents. Within the context of this invention, the term "neutralizing agents" is meant to embrace all types of agents which are useful for converting potential ionic groups to ionic groups.

The compounds containing isocyanate and alkoxysilane groups according to the invention are prepared by reacting the polyisocyanate component with sufficient amounts of the hydrophilic compounds such that the resulting product can be stably dispersed in water and reacting 2 to 98 equivalent percent of the remaining isocyanate groups with a compound containing alkoxysilane groups such that the resulting product contains 0.2 to 4.5% by weight, preferably 0.2 to 4% by weight and more preferably 0.5 to 3.5% by weight of alkoxysilane groups (calculated as Si, MW 28). The products have an isocyanate group content of 0.2 to 20% by weight, preferably 0.2 to 15% by weight and more preferably 0.5 to 10% by weight (calculated as NCO, MW 42). The preceding percentages are based on the weight of the product.

The reaction is preferably carried out by incrementally adding the isocyanate-reactive compound to the polyisocyanate. The amino-functional silane and the isocyanate-reactive hydrophilic compound may be added sequentially or in admixture, preferably the hydrophilic compound is added first, followed by the amino-functional silane.

The compounds according to the invention can also be prepared by mixing different types of compounds, provided that they satisfy the preceding guidelines regarding the amounts hydrophilic groups, alkoxysilane groups and isocyanate groups. For example, compounds which contain alkoxysilane groups, but are free from isocyanate groups, and/or compounds which contain isocyanate groups, but which do not contain alkoxysilane groups, may be present as a portion of the compounds according to the invention.

The reaction to form the urea groups is conducted at a temperature of 10 to 100° C., preferably 20 to 80° C. and more preferably 20 to 50° C., while the reaction to incorporate isocyanate-reactive hydrophilic compounds is conducted at a temperature of 20 to 150° C., preferably 50 to 120° C. and more preferably 60 to 100° C.

The compounds of the present invention are suitable for use in aqueous, two-component, coating, sealing or adhesive compositions, which may be present either as oil-in-water or as water-in-oil emulsions. The compounds according to the invention are used in combination with compounds or resins containing isocyanate-reactive groups, such as hydroxy or amino groups, and having a number average molecular weight ($M_n$, which may be calculated by end group analysis) of at least 400, preferably 400 to 100,000. These isocyanate-reactive resins are known from two-component, polyurethane waterborne technology.

Examples include the polyacrylate resins described in U.S. Pat. No. 5,075,370 (herein incorporated by reference); the urethane group-containing resins described in U.S. Pat. Nos. 5,389,718 and 5,387,642 (both of which are herein incorporated by reference); the polyester, polylactone, polycarbonate, polyether, polythioether, polyacetal, polyether ester, polyester amide and polyamide resins described in U.S. Pat. No. 5,372,875 (herein incorporated by reference); the polyacrylate grafted polyester resins described in U.S. Pat. No. 5,336,711 (herein incorporated by reference); the sulfonate group containing polyester resins described in U.S. Pat. No. 5,344,873 (herein incorporated by reference); and the cationically modified resins described in U.S. Pat. No. 5,459,197 (herein incorporated by reference).

The aqueous two-component compositions may be prepared by simply mixing the compounds containing isocyanate and alkoxy silane groups with the isocyanate-reactive compounds. If desired, the compounds containing isocyanate and alkoxy silane groups can be mixed with water prior to mixing these compounds with the isocyanate-reactive compounds. The amount of water may be sufficient to form either a water-in-oil emulsion or an oil-in-water emulsion. Either before, during or after the two-components have been mixed, additional water can be added to obtain the final solids content.

The aqueous coating compositions of the present invention may optionally contain acidic or basic catalysts to accelerate the curing reaction. Examples include acids such as paratoluene sulfonic acid; metallic salts such as dibutyl tin dilaurate; tertiary amines such as triethylamine or triethylene diamine; and mixtures of these catalysts. Low molecular weight, basic aminoalkyl trialkoxysilanes, such as those represented by formula IV, also accelerate hardening of the compounds according to the invention.

The two-component compositions generally have a solids content of 20 to 80% by weight, more preferably 30 to 70% by weight and most preferably 35 to 50% by weight, based on the weight of the two-component composition. The compositions may also contain known additives, such as leveling agents, wetting agents, flow control agents, anti-skinning agents, antifoaming agents, fillers (such as silica, aluminum silicates and high-boiling waxes), viscosity regulators, plasticizers, pigments, dyes, UV absorbers and stabilizers against thermal and oxidative degradation.

The two-component compositions may be applied to any desired substrates, such as wood, plastics, leather, paper, textiles, glass, ceramics, plaster, masonry, metals and concrete. They may be applied by standard methods, such as spray coating, spread coating, flood coating, casting, dip coating or roll coating. The coating compositions may be clear or pigmented lacquers.

The two-component compositions may be cured either at elevated temperatures of 120 to 180° C., preferably 130 to 150° C., for approximately 30 minutes, or at ambient temperature.

The invention is further illustrated but is not intended to be limited by the following examples in which all parts and percentages are by weight unless otherwise specified.

EXAMPLES

Polyisocyanate 1

An isocyanurate group-containing polyisocyanate prepared from 1,6-hexamethylene diisocyanate and having an isocyanate content of 21.6%, a monomeric diisocyanate content of <0.2% and a viscosity at 20° C. of 3000 mPa.s (available from Bayer Corporation as Desmodur N 3300).

Polyether 1

A polyethylene oxide monool prepared by the ethoxylation of methanol and having a molecular weight of 550 (available from Union Carbide as Carbowax 550).

Polyether 2

A polyethylene oxide monool having a molecular weight of 625 and prepared by the sequential propoxylation/ethoxylation (1/99 ratio) of 2-(2-butoxyethoxy)-ethanol.

Aqueous Polyol 1

A water dispersible polyester polyol having a resin solids content of 30% and an OH no. of 49.2 mg KOH/g solution (Desmophen XP-7093, available from Bayer Corp.).

Example 1

Preparation of N-(3-Trimethoxysilylpropyl) Aspartic Acid Diethyl Ester 1438 parts (8.27 equiv.) of 3-aminopropyltrimethoxysilane were added to a 5 liter flask fitted with agitator, thermocouple, nitrogen inlet and addition funnel with condenser. 1423.2 parts (8.27 equiv.) of diethyl maleate were added dropwise over a period of 2 hours. The temperature of the reactor was maintained at 25° C. during the addition. The reactor was maintained at 25° C. for an additional 5 hours at which time the product was poured into glass containers and sealed under a blanket of nitrogen. After one week the unsaturation number was 0.6 indicating the reaction was ~99% complete. The product, N-(3-trimethoxysilylpropyl) aspartic acid diethyl ester, had a viscosity of 11 mPa.s at 25° C.

Example 2

Preparation of Water Dispersible Resin 1

195 parts (1 equiv) of polyisocyanate 1 were added at ambient temperature to a three neck, 5 liter, round bottom flask equipped with an agitator, nitrogen inlet, thermocouple and addition funnel with condenser. 183.3 parts (0.5 equiv.) of N-(3-trimethoxysilylpropyl) aspartic acid diethyl ester were added through an addition funnel to control the exotherm, which raised the temperature of the reactor to 70° C. After cooling 55 parts (0.1 equiv.) of polyether 1, heated to 60° C., were added to the reaction flask as quickly as possible. A mild exotherm increased the temperature to 60° C. The reaction was maintained at 60° C. for 4 hours, at which time the isocyanate content was 4.55% (theoretical NCO 3.86%) and the viscosity at 25° C. was 18,300 mPa.s.

20 parts of this product was combined with 10 parts of water and stirred at high speed with a lightning mixer. A stable dispersion resulted.

Example 3

Preparation of Water Dispersible Resin 2

195 parts (1 equiv) of polyisocyanate 1 were added at ambient temperature to a three neck, 5 liter, round bottom flask equipped with an agitator, nitrogen inlet, thermocouple and addition funnel with condenser. The reaction flask was heated to 60° C. 35 parts (0.055 equiv.) of polyether 2, heated to 60° C., was added to the reaction flask through the addition funnel over a twenty minute period in order to control the exotherm for the formation of the urethane.

The reaction was cooled to 40° C. and 17.2 parts (0.05 equiv.) of bis -(3-trimethoxysilylpropyl) amine were added through an addition funnel to control the exotherm. The reaction was heated for an additional 3 hours and then cooled to room temperature. The resulting product had an NCO content of 15.6% (theoretical NCO 15.7%) and a viscosity at 25° C. of 3800 mPa.s.

20 parts of this product was combined with 10 parts of water and stirred at high speed with a lightning mixer. A stable dispersion resulted.

Example 4

Preparation of Water Dispersible Resin 3

Example 3 was repeated with the exception that 0.5 equivalents of N-phenyl-N-(3-triethoxysilylpropyl) amine were used instead of bis-(3-trimethoxysilylpropyl)amine. The resulting product had an NCO content of 15.2% (theoretical NCO 15.2%) and a viscosity at 25° C. of 4000 mPa.s.

20 parts of this product was combined with 10 parts of water and stirred at high speed with a lightning mixer. A stable dispersion resulted.

Example 5

(ComParison)—Preparation of Water Dispersible Resin 4

Example 3 was repeated with the exception that 0.5 equivalents of N-(3-triethoxysilylpropyl) amine were used instead of bis-(3-trimethoxysilylpropyl) amine. The resulting product was a solid and had an NCO content of 15.0% (theoretical NCO 14.8%) and a viscosity at 25° C. of 4000 mPa.s.

20 parts of this product was combined with 10 parts of water and stirred at high speed with a lightning mixer. The resin could not be dispersed.

The preceding examples demonstrate the need to use compounds containing alkoxysilane groups and secondary amino groups in order to obtain modified polyisocyanates that can be stably dispersed in water.

Example 6

Preparation of Coatings

Water dispersible resin 1 was dispersed in an equal amount of water on a high speed mixer and then mixed with aqueous polyol 1 and with 0.5 parts of catalyst (a proprietary titanate chelate, available as Tyzor 131 from DuPont). The resulting mixtures were used to prepare films which were drawn down on cold rolled steel at a wet film thickness sufficient to provide a dry film thickness of 1 to 1.5 mils and cured either at room temperature or at elevated temperature as set forth in the following Table. The amounts of the various components and the properties of the resulting coatings are also set forth in the following table.

| Example 6 | |
| --- | --- |
| Ingredients | Amounts in parts |
| Water dispersible resin 2 | 10 |
| Water | 10 |
| Aqueous Polyol 1 | 5.4 |
| Catalyst | 0.5 |
| Cure at 25° C./55% RH | |
| Gardner Dry Time, days | 5 |
| MEK Double Rubs | 100 |
| Pencil Hardness | HB |
| Cure at 130° C./30 min. | |
| MEK Double Rubs | 100 |
| Pencil Hardness | 3H |

Dry times were determined with a Gardner Dry Time meter as described in Pacific Scientific Instruction manuals DG-9600 and DG-9300.

MEK double rubs was determined by wetting a cloth with methyl ethyl ketone and then rubbing each panel up to 100 times. A double rub consists of one back and forth rub against the coated panel. Values of less than 100 indicate the number of double rubs before the coatings was destroyed.

Pencil hardness was determined in accordance with ASTM D-3363. The order of hardnesses are as follows from softest to hardest: 6B to 1B, HB, F, 1H to 8H.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A compound having an isocyanate group content (calculated as NCO, MW 42) of 0.2 to 20% by weight and an alkoxysilane group content (calculated as Si, MW 28) of 0.2 to 4.5% by weight, wherein the preceding percentages are based on the weight of the compounds, and containing sufficient chemically incorporated hydrophilic groups to form a stable dispersion in water, wherein the alkoxysilane groups are incorporated as the reaction product of
   i) a polyisocyanate component having a minimum average functionality of 2.4 and containing at least 50% by weight of a polyisocyanate adduct and
   ii) an amino compound corresponding to formula I

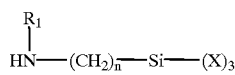

(I)

wherein
  X represents identical or different organic groups which are inert to isocyanate groups below 100° C., provided that at least one of these groups is an alkoxy group,
  $R_1$ represents an organic group which is inert to isocyanate groups at a temperature of 100° C. or less, and
  n is an integer from 1 to 8.

2. The compound of claim 1 wherein said amino compound corresponds to formula III

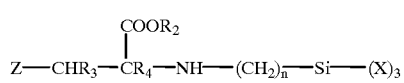

(III)

wherein
  Z represents $COOR_5$ or an aromatic ring,
  $R_2$ and $R_5$ are identical or different and represent organic groups which are inert to isocyanate groups at a temperature of 100° C. or less, and
  $R_3$ and $R_4$ are identical or different and represent hydrogen or organic groups which are inert to isocyanate groups at a temperature of 100° C. or less.

3. The compound of claim 2 wherein
  X represents identical or different alkyl or alkoxy groups having 1 to 4 carbon atoms,
  Z represents $COOR_5$,
  $R_2$ and $R_5$ are identical or different and represent alkyl groups having 1 to 9 carbon atoms,
  $R_3$ and $R_4$ represent hydrogen and
  n is an integer from 2 to 4.

4. The compound of claim 2 wherein
  X represents identical or different alkoxy groups having 1 to 4 carbon atoms,
  Z represents $COOR_5$,
  $R_2$ and $R_5$ are identical or different and represent methyl, ethyl or butyl,
  $R_3$ and $R_4$ represent hydrogen and
  n is 3.

5. The compound of claim 1 wherein the polyisocyanate component has a minimum average functionality of at least 2.8 and contains at least 70% by weight of a polyisocyanate adduct.

6. The compound of claim 2 wherein the polyisocyanate component has a minimum average functionality of at least 2.8 and contains at least 70% by weight of a polyisocyanate adduct.

7. The compound of claim 3 wherein the polyisocyanate component has a minimum average functionality of at least 2.8 and contains at least 70% by weight of a polyisocyanate adduct.

8. The compound of claim 4 wherein the polyisocyanate component has a minimum average functionality of at least 2.8 and contains at least 70% by weight of a polyisocyanate adduct.

9. The compound of claim 5 wherein said polyisocyanate adduct contains isocyanurate groups, biuret groups, allophanate groups and/or uretdione groups.

10. The compound of claim 6 wherein said polyisocyanate adduct contains isocyanurate groups, biuret groups, allophanate groups and/or uretdione groups.

11. The compound of claim 7 wherein said polyisocyanate adduct contains isocyanurate groups, biuret groups, allophanate groups and/or uretdione groups.

12. The compound of claim 8 wherein said polyisocyanate adduct contains isocyanurate groups, biuret groups, allophanate groups and/or uretdione groups.

13. The compound of claim 9 which has an isocyanate group content (calculated as NCO, MW 42) of 0.5 to 20% by weight and an alkoxysilane group content (calculated as Si, MW 28) of 0.5 to 4.5% by weight, wherein the preceding percentages are based on the weight of the compound, and wherein said polyisocyanate adduct is prepared from 1,6-hexamethylene diisocyanate.

14. The compound of claim 10 which has an isocyanate group content (calculated as NCO, MW 42) of 0.5 to 20% by weight and an alkoxysilane group content (calculated as Si, MW 28) of 0.5 to 4.5% by weight, wherein the preceding percentages are based on the weight of the compound, and wherein said polyisocyanate adduct is prepared from 1,6-hexamethylene diisocyanate.

15. The compound of claim 11 which has an isocyanate group content (calculated as NCO, MW 42) of 0.5 to 20% by weight and an alkoxysilane group content (calculated as Si, MW 28) of 0.5 to 4.5% by weight, wherein the preceding percentages are based on the weight of the compound, and wherein said polyisocyanate adduct is prepared from 1,6-hexamethylene diisocyanate.

16. The compound of claim 12 which has an isocyanate group content (calculated as NCO, MW 42) of 0.5 to 20% by weight and an alkoxysilane group content (calculated as Si, MW 28) of 0.5 to 4.5% by weight, wherein the preceding percentages are based on the weight of the compound, and wherein said polyisocyanate adduct is prepared from 1,6-hexamethylene diisocyanate.

17. The compound of claim 1 wherein the compound contains a minimum of 2.5% of hydrophilic ethylene oxide units, based on the weight of the compound containing isocyanate and alkoxysilane groups, or a minimum of 5 milliequivalents of ionic groups per 100 parts of the compound containing isocyanate and alkoxysilane groups.

* * * * *